United States Patent
Um et al.

(10) Patent No.: US 8,995,409 B2
(45) Date of Patent: Mar. 31, 2015

(54) COMMUNICATION METHOD USING A PREAMBLE TO SHARE CHARACTERISTIC INFORMATION, METHOD FOR GENERATING THE PREAMBLE, AND COMMUNICATION SYSTEM TO WHICH THE METHODS ARE APPLIED

(75) Inventors: Jung Sun Um, Daejeon (KR); Sung Hyun Hwang, Daejeon (KR); Hoi Yoon Jung, Daejeon (KR); Byung Jang Jeong, Daejeon (KR); Chang Joo Kim, Daejeon (KR); Gwang Zeen Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 224 days.

(21) Appl. No.: 13/818,492

(22) PCT Filed: Aug. 22, 2011

(86) PCT No.: PCT/KR2011/006193
§ 371 (c)(1),
(2), (4) Date: Feb. 22, 2013

(87) PCT Pub. No.: WO2012/026727
PCT Pub. Date: Mar. 1, 2012

(65) Prior Publication Data
US 2013/0163572 A1 Jun. 27, 2013

(30) Foreign Application Priority Data

Aug. 23, 2010 (KR) .......................... 10-2010-0081479
Jun. 2, 2011 (KR) .......................... 10-2011-0053392

(51) Int. Cl.
*H04W 72/04* (2009.01)
*H04L 5/00* (2006.01)
*H04L 27/26* (2006.01)
*H04B 7/06* (2006.01)

(52) U.S. Cl.
CPC ........... *H04W 72/044* (2013.01); *H04L 5/0048* (2013.01); *H04L 27/2605* (2013.01); *H04L 27/2613* (2013.01); *H04L 5/0023* (2013.01); *H04B 7/0689* (2013.01)
USPC ............ 370/336; 370/210; 370/280; 370/338

(58) Field of Classification Search
None
See application file for complete search history.

(56) References Cited

U.S. PATENT DOCUMENTS

| | | | | |
|---|---|---|---|---|
| 6,151,371 A * | 11/2000 | Maruyama | ..................... | 375/344 |
| 6,356,555 B1 * | 3/2002 | Rakib et al. | ................... | 370/441 |
| 6,522,702 B1 * | 2/2003 | Maruyama | ..................... | 375/324 |
| 7,428,273 B2 * | 9/2008 | Foster | ........................... | 375/329 |
| 8,467,331 B2 * | 6/2013 | Lakkis | .......................... | 370/319 |
| 2011/0103271 A1 * | 5/2011 | Han et al. | ....................... | 370/280 |

FOREIGN PATENT DOCUMENTS

| KR | 1020090060956 A | 6/2009 |
|---|---|---|
| KR | 1020090100205 A | 9/2009 |
| KR | 1020090121175 A | 11/2009 |

\* cited by examiner

*Primary Examiner* — Anh-Vu Ly
*Assistant Examiner* — Hashim Bhatti
(74) *Attorney, Agent, or Firm* — William Park & Associates Patent Ltd.

(57) ABSTRACT

A communication method of a transmitter using a preamble in a wireless communication system, includes determining at least two subcarriers from among a plurality of subcarriers, for the preamble; mapping a subcarrier sequence and a subcarrier phase value of the preamble to the at least two subcarriers; and transmitting the preamble using the at least two subcarriers. The preamble may include a real component having a first repeated pattern in a preset time interval, and an imaginary component having a second repeated pattern in the preset time interval, and a relationship between the first repeated pattern and the second repeated pattern may indicate characteristic information of the wireless communication system.

16 Claims, 11 Drawing Sheets

FIG. 6

| Index | -48 | -40 | -32 | -24 | -16 | -8 | 0 | 8 | 16 | 24 | 32 | 40 | 48 |
|---|---|---|---|---|---|---|---|---|---|---|---|---|---|
| value | 1 | -j | 1 | j | -1 | j | | 1 | -j | 1 | j | -1 | j |

610

COMMUNICATION METHOD USING A PREAMBLE TO SHARE CHARACTERISTIC INFORMATION, METHOD FOR GENERATING THE PREAMBLE, AND COMMUNICATION SYSTEM TO WHICH THE METHODS ARE APPLIED

TECHNICAL FIELD

The present invention relates to a method of generating a preamble in a communication system, and a method of performing communication using the preamble.

BACKGROUND ART

A wireless communication system may be operated in various transmission modes, for example, a diversity mode, a Multiple-Input and Multiple-Output (MIMO) mode, and the like. A reception mode of a receiver may vary depending on a type of transmission modes. Accordingly; information regarding the transmission modes needs to be shared between a transmitter and a receiver.

Additionally, the wireless communication system may used a plurality of available frequency bands. Information on currently used frequency bands, and information on unused frequency bands need to be shared between the transmitter and the receiver.

Furthermore, the transmitter and the receiver may share a variety of information, as well as the above-described information. However, to share the above-described information, the transmitter may request information bits corresponding to the information. The information bits may function as an overhead in a communication system.

DISCLOSURE OF INVENTION

Technical Goals

An aspect of the present invention provides a technology that may efficiently share characteristic information of a wireless communication system between a transmitter and a receiver, white minimizing an amount of information bits.

Another aspect of the present invention provides a technology that may share characteristic information of a wireless communication system, using a preamble.

Still another aspect of the present invention provides a technology that may share characteristic information of a wireless communication system, using various repeated patterns of a preamble.

Yet aspect of the present invention provides a technology that may efficiently share characteristic information of a wireless communication system, by designing a preamble so that a relationship between a first repeated pattern of a real component of a preamble and a second, repeated pattern of an imaginary component of the preamble indicates the characteristic information.

Technical Solutions

According to an aspect of the present invention, there is provided a communication method of a transmitter using a preamble in a wireless communication system, the communication method including: determining at least two subcarriers from among a plurality of subcarriers, for the preamble; mapping a subcarrier sequence and a subcarrier phase value of the preamble to the at least two subcarriers; and transmitting the preamble using the at least two subcarriers. The preamble may include a real component having a first repeated pattern in a preset time interval, and an imaginary component having a second repeated pattern in the preset time interval, and a relationship between the first repeated pattern and the second repeated pattern indicates characteristic information of the wireless communication system.

The mapping may include mapping the subcarrier sequence and the subcarrier phase value to the at least two subcarriers, using a subcarrier sequence set including 1 and −1, and using a subcarrier phase value set including 1, −1 j, and −j, based on the relationship between the first repeated pattern and the second repeated pattern.

The determining may include determining the at least two subcarriers so that a gap between the at least two subcarriers corresponds to R based on a DC, when each of the first repeated pattern and the second repeated pattern includes R basic repeated patterns for the preset time interval, wherein R is a natural number.

The subcarrier sequence mapped to the at least two subcarriers may be dependent on the first repeated pattern and the second repeated pattern.

The first repeated pattern may include a first basic repeated pattern repeated for the preset time interval and the second repeated pattern may include a second basic repeated pattern repeated for the preset time interval. The determining and the mapping may be performed, so that the first basic repeated pattern may be symmetric with respect to a Y-axis in a middle portion of the first basic repeated pattern, that the second basic repeated pattern may be symmetric with respect to an original point in a middle portion of the second basic repeated pattern, and that the same pattern may be repeated within a half of the first basic repeated pattern.

The first repeated pattern may include a first basic repeated pattern repeated for the preset time interval, and the second repeated pattern may include a second basic repeated pattern repeated for the preset time interval. The determining and the mapping may be performed, so that the first basic repeated pattern may be symmetric with respect to a Y-axis in a middle portion of the first basic repeated pattern, that the second basic repeated pattern may be symmetric with respect to an original point in a middle portion of the second basic repeated pattern, and that the same pattern may be repeated within a half of the second basic repeated pattern.

The mapping may include mapping the subcarrier sequence and the subcarrier phase value to the at least two subcarriers, using a subcarrier sequence set including 1 and −1, and using a subcarrier phase value set including 1, −1 j, and −j, based on the relationship between the first repeated pattern and the second repeated pattern.

The subcarrier phase value may be either j or −j.

The first repeated pattern may include a first basic repeated pattern repeated for the preset time interval, and the second repeated pattern may include a second basic repeated pattern repeated for the preset time interval. The determining and the mapping may be performed, so that the first basic repeated pattern and the second basic repeated pattern may be identical to each other.

The first repeated pattern may include a first basic repeated pattern repeated for the preset time interval, and the second repeated pattern may include a second basic repeated pattern repeated for the preset time interval. The determining and the mapping may be performed, so that a front part of the first basic repeated pattern based on the middle portion of the first basic repeated pattern may be identical to, or may have the same absolute value as a back part of the second basic repeated pattern based on the middle portion of the second basic repeated pattern, and that a back part of the first basic repeated pattern based on the middle portion of the first basic repeated pattern may be identical to, or may have the same absolute value as a front part of the second basic repeated pattern based on the middle portion of the second basic repeated pattern.

The characteristic information of the wireless communication system may include information on a frequency band currently used in the wireless communication system, or information on a transmission mode currently used in the wireless communication system.

The characteristic information of the wireless communication system may represent the information on the frequency band, using the subcarrier sequence and the subcarrier phase value that correspond to the relationship between the first repeated pattern and the second repeated pattern, or using a selection of the at least two subcarriers.

The information on the frequency band may include either channel difference information, or absolute value information of a channel. The channel difference information may be associated with a difference between a first frequency band and a second frequency band when the first frequency band and the second frequency band are currently used.

According to another aspect of the present invention, there is provided a communication method of a receiver using a preamble in a wireless communication system, the communication method including: receiving a preamble via at least two subcarriers among a plurality of subcarriers; and extracting characteristic information of the wireless communication system using the preamble. A subcarrier sequence and a subcarrier phase value of the preamble may be mapped to the at least two subcarriers. The preamble may include a real component having a first repeated pattern in a preset time interval, and an imaginary component having a second repeated pattern in the preset time interval and a relationship between the first repeated pattern and the second repeated pattern may indicate the characteristic information of the wireless communication system.

The subcarrier sequence and the subcarrier phase value may be mapped to the at least two subcarriers, using a subcarrier sequence set including 1 and −1, and using a subcarrier phase value set including 1, −1, j, and −j, based on the relationship between the first repeated pattern and the second repeated pattern.

The characteristic information of the wireless communication system may include information on a frequency band currently used in the wireless communication system, or information on a transmission mode currently used in the wireless communication system. The extracting may include extracting the characteristic information of the wireless communication system using a correlation value of the preamble.

When each of the first repeated pattern and the second repeated pattern includes R basic repealed patterns for the preset time interval, a gap between the at least two subcarriers may correspond to R, wherein R is a natural number.

According to another aspect of the present invention, there is provided a method of generating a preamble in a wireless communication system, the method including: selecting at least two subcarriers from among a plurality of subcarriers, to generate a preamble including a real component having a first repeated pattern in a preset time interval, and an imaginary component having a second repeated pattern in the preset time interval; selecting a subcarrier sequence and a subcarrier phase value, using a subcarrier sequence set including 1 and −1, and using a subcarrier phase value set including 1, −1, j, and j; and assigning the subcarrier sequence and the subcarrier phase value to the at least two subcarriers, and generating the preamble.

A relationship between the first repeated pattern and the second repeated pattern may indicate characteristic information of the wireless communication system.

According to another aspect of the present invention, there is provided a communication apparatus to perform transmission or reception using a preamble in a wireless communication system, the communication apparatus including: an interface module to transmit or receive the preamble; and a processor to generate the preamble to represent characteristic information of the wireless communication system, or to process the preamble to extract the characteristic information of the wireless communication system. The preamble may include a real component having a first repeated pattern in a preset time interval, and an imaginary component having a second repeated pattern in the preset time interval. A relationship between the first repeated pattern and the second repeated pattern may indicate the characteristic information of the wireless communication system.

Effect of the Invention

According to embodiments of the present invention, it is possible to efficiently share characteristic information of a wireless communication system between a transmitter and a receiver, while minimizing an amount of information bits.

Additionally, according to embodiments of the present invention, it is possible to share characteristic information of a wireless communication system, using a preamble.

Furthermore, according to embodiments of the present invention, it is possible to share characteristic information of a wireless communication system, using various repeated patterns of a preamble.

Moreover, according to embodiments of the present invention, it is possible to efficiently share characteristic information of a wireless communication system, by designing a preamble so that a relationship between a first repeated pattern of a real component of a preamble and a second repeated pattern of an imaginary component of the preamble indicates the characteristic information.

BRIEF DESCRIPTION OF DRAWINGS

FIG. 6 is a table showing values corresponding to subcarriers according to an embodiment of the present invention.

BEST MODE FOR CARRYING OUT THE INVENTION

Figure 1:
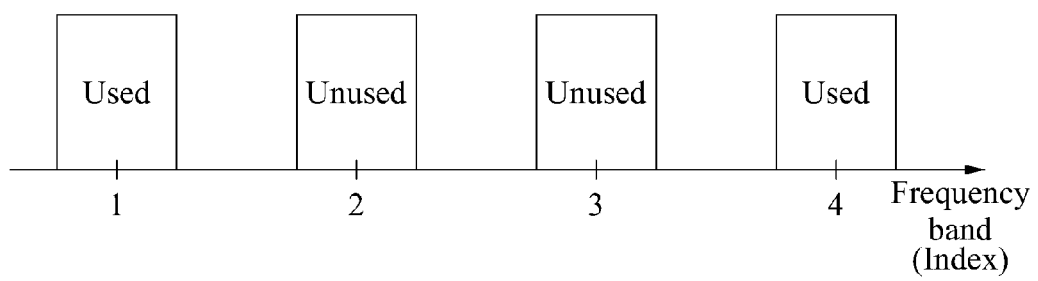
FIG. 1 conceptually illustrates whether available frequency bands are currently used by a wireless communication system.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 conceptually illustrates whether available frequency bands are currently used by a wireless communication system.

Referring to FIG. 1, the wireless communication system may use at least one frequency band among frequency bands with indexes 1, 2, 3, and 4. For example, the wireless communication system of FIG. 1 may use the frequency bands with indexes 1 and 4, and may not use the frequency bands with indexes 2 and 3.

When communication between a transmitter and a receiver is required, at least one of the unused frequency bands with indexes 2 and 3 may be allocated to the communication. Accordingly, the transmitter needs to transmit, to the receiver, information notifying that the frequency bands with indexes 1 and 4 are currently used and that the frequency hands with indexes 2 and 3 are not used.

In the present invention, although described in detail later, it is possible to generate various patterns of a preamble, and to efficiently transmit the above-described information to the receiver using the various patterns.

Figure 2:
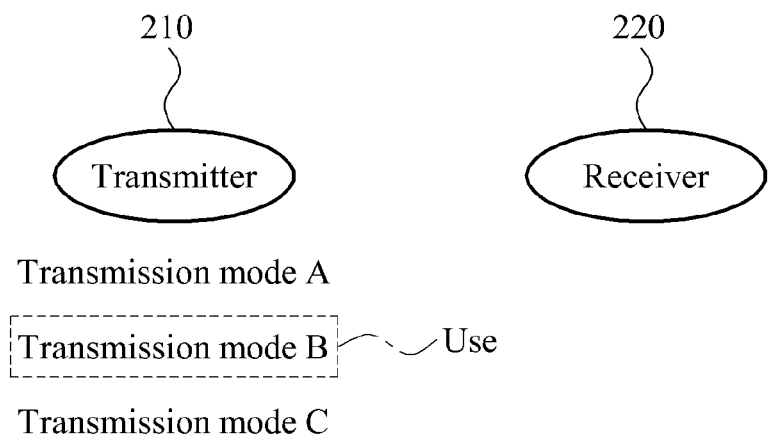
FIG. 2 illustrates a wireless communication system including a transmitter that may use various transmission modes, and a receiver corresponding to the transmitter.

FIG. 2 illustrates a wireless communication system including a transmitter that may use various transmission modes, and a receiver corresponding to the transmitter.

Referring to FIG. 2, a transmitter 210 of the wireless communication system may transmit data to a receiver 220, using various transmission modes, for example transmission modes A, B, C, and the like. The transmission modes may include, for example, a default transmission mode, a diversity transmission mode, a Single User (SU)-Multiple-Input and Multiple-Output (MIMO) mode, a Multi-User (MU)-MIMO mode, and the like.

For example, when the transmission mode B is used by the transmitter 210, the transmitter 210 may need to transmit information on the used transmission mode B to the receiver 220. According to the present invention, the transmitter 210 and the receiver 220 may share the information using various patterns of a preamble.

1. Design of Various Patterns of Preamble

In an Orthogonal Frequency-Division Multiplexing (OFDM) communication system, a preamble may be used for various purposes, for example, for Auto Gain Control (AGC), time synchronization, frequency synchronization, channel estimation, and the like. In general a preamble may be transmitted from a front part of a frame, and may be generated by mapping a plurality of subcarriers to a specific sequence (hereinafter, referred to as a subcarrier sequence).

When the subcarrier sequence is transmitted through all the subcarriers, the preamble may have a pattern appearing randomly in a time domain for an Fast Fourier Transform (FFT) period, namely, a time period corresponding to a size of FFT. For example, to design a preamble with a pattern repeated in a time domain for a single FFT period, a specific subcarrier selected from among all the subcarriers needs to be matched to a subcarrier sequence. Referring to a typical wireless Local Area Network (LAN) standard, a preamble has a pattern repeated in a time domain for an FFT period. The pattern of the preamble that is repeated in the time domain for the FFT period may be beneficial in detecting a preamble, defecting a frequency offset, and the like. Various patterns may be repeated for the FFT period, although described in detail later.

A preamble used in the OFDM communication system may be represented by the following equations;

$$P(n) = \sum_{\substack{k=0 \\ k \in R}}^{N-1} \left[ J_k S_k \cdot e^{j 2\pi \frac{n}{N} k} \right]$$

or $$P(n) = \sum_{\substack{k=-N/2 \\ k \in R}}^{N/2-1} \left[ J_k \cdot S_k \cdot e^{j 2\pi \frac{n}{N} k} \right]$$

A first equation represents a typical preamble, and a second equation represents a preamble in an example in which subcarriers exist around an actual DC. For simplification of description, the second equation may be mainly referred to in the present specification.

P(n) denotes an n-th sample of a preamble in a time domain, and $S_k$, as a subcarrier sequence mapped to a k-th subcarrier, denotes an element of a subcarrier sequence set including −1 and 1. Additionally, $J_k$, as a subcarrier phase value, denotes an element of a subcarrier phase value set including 1, −1, j, and −j, N denotes a size of FFT, and R denotes a set of subcarriers used in generating of a preamble. In the present invention, it is possible to diversify patterns of the preamble, by appropriately selecting a subcarrier sequence and a subcarrier phase value corresponding to subcarriers, using $S_k$, $J_k$, and R.

Figure 3:
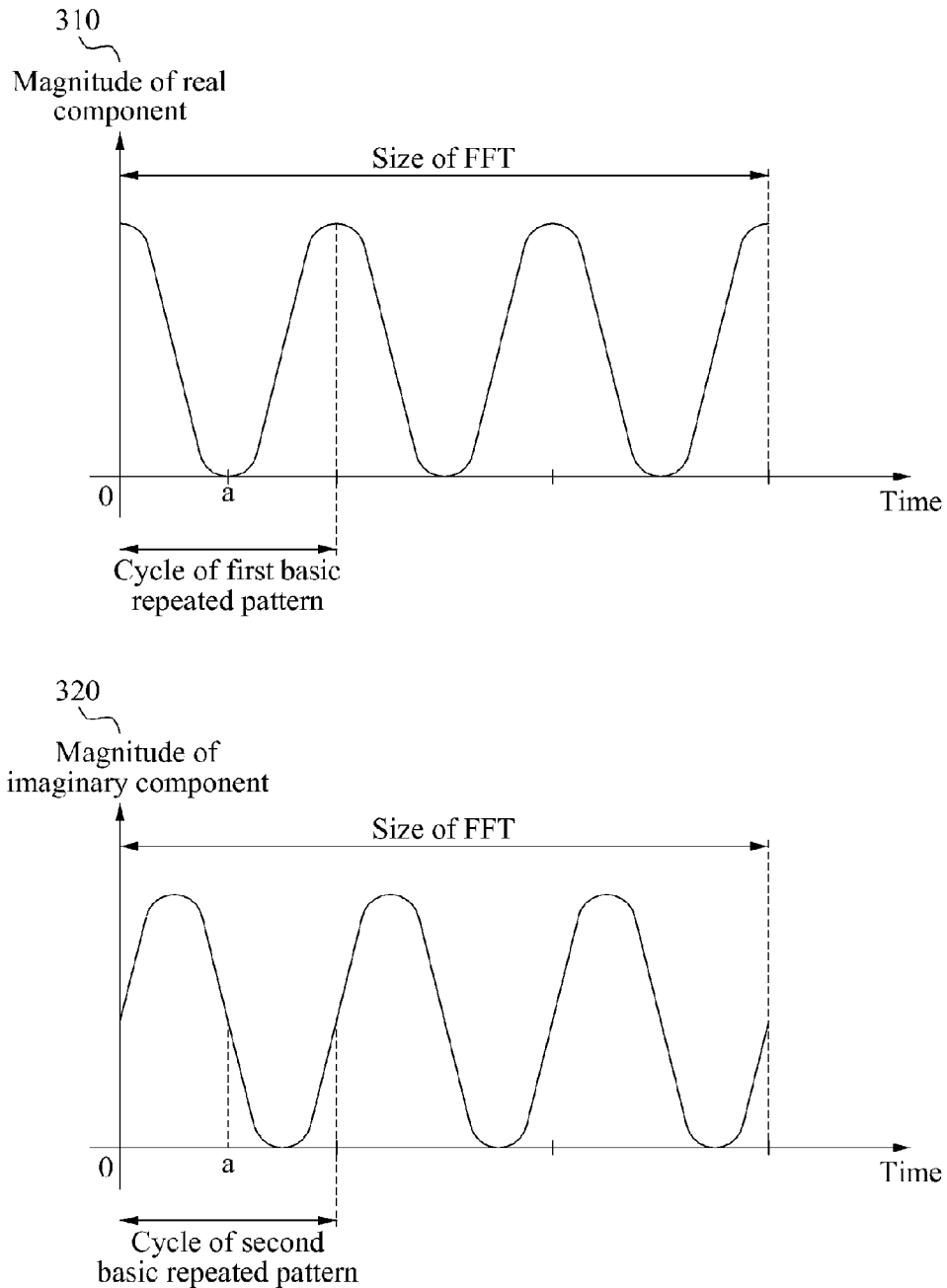
FIG. 3 illustrates a real component of a preamble with a first repeated pattern, and an imaginary component of the preamble with a second repeated pattern in a time domain.

A real component, and an imaginary component of the preamble generated according to the present invention may be individually analyzed in a time domain. Hereinafter, in the time domain, a repeated pattern of the real component, and a repeated pattern of the imaginary component may be individually analyzed. When the repeated pattern of the real component is assumed as a first repeated pattern, and the repeated pattern of the imaginary component is assumed as a second repeated pattern, first basic repeated patterns included in the first repeated pattern may be repeated a plurality of times for the FFT period, and second basic repeated patterns included in the second repeated pattern may also be repeated a plurality of times for the FFT period. For reference, a plot 310 of FIG. 3 is associated with the first repeated pattern, and a plot 320 is associated with the second repeated pattern. The first repeated pattern may include a first basic repeated pattern repeated a plurality of times for the FFT period, and the second repeated pattern may also include a second basic repeated pattern repeated a plurality of times.

When a number of repetitions of the first basic repeated pattern, and a number of repetitions of the second basic repeated pattern for the FFT period are determined, subcarriers used in generating of a preamble (or locations of the subcarriers) may be determined based on the number of repetitions. For example, when the number of repetitions of the first basic repeated pattern, and the number of repetitions of the second basic repeated pattern are T, subcarriers with indexes corresponding to an integer multiple of T may be selected in the present invention. For example, when the number of repetitions of the first basic repeated pattern, and the number of repetitions of the second basic repeated pattern are 8, subcarriers with indexes of 8, 16, 24, ..., −8, −16, −24, and the like may be selected. Here, naturally, a part of the subcarriers may not be matched to the subcarrier sequence and the subcarrier phase value.

Hereinafter, examples of patterns of a preamble proposed by the present invention will be described.

(1) Basic Pattern

According to the present invention, the first basic repeated pattern may be symmetric with respect to a Y-axis in a middle portion of the first basic repeated pattern (for example, time 'a' in FIG. 3), and the second basic repeated pattern may be symmetric with respect to the origin in a middle portion of the second basic repeated pattern (for example, time 'a' in FIG. 3). For example, the first basic repeated pattern may be a pattern of a cosine function, and the second basic repeated pattern may be a pattern of a sine function. Examples of the patterns are shown in FIG. 3. FIG. 3 illustrates a real component of a preamble with the first repeated pattern, and an imaginary component of the preamble with the second repeated pattern, in a time domain.

(2) Pattern in which the first basic repeated pattern is symmetric with respect to the Y-axis in the middle portion of the first basic repeated pattern, in which the second basic repeated pattern is symmetric with respect to the origin in the middle portion of the second basic repeated pattern, and in which the same pattern is repeated within a half of the first basic repeated pattern For the above pattern, the following method may be used. In other words, a value having different signs may be mapped to subcarriers with indexes, namely positive odd multiples of the number of repetitions T, and to subcarriers with indexes, namely negative odd multiples of the number of repetitions T. Here, the value may be obtained by multiplying the subcarrier phase value by the subcarrier sequence. Additionally, a value having the same sign may be mapped to subcarriers with indexes, namely positive even multiples of the number of repetitions T, and to subcarriers with indexes, namely negative even multiples of the number of repetitions T.

Specifically, $J_k$ may be always 1, $S_{Rp \cdot 2m} = S_{-Rp \cdot 2m}$, and $S_{Rp \cdot (2m+1)} = -S_{-Rp \cdot (2m+1)}$.

Alternatively, $S_{Rp \cdot 2m} = S_{-Rp \cdot 2m}$, and $S_{Rp \cdot (2m+1)} = S_{-Rp \cdot (2m+1)}$. When $k = -Rp \cdot (2m+1)$, $J_k$ may be −1.

Alternatively, $S_{Rp \cdot 2m} = S_{-Rp \cdot 2m}$, and $S_{Rp \cdot (2m+1)} = S_{-Rp \cdot (2m+1)}$. When $k = -Rp \cdot (2m+1)$, $J_k$ may be −1.

Here, Rp denotes a number of repetitions, and m denotes a positive integer starting from 0.

(3) Pattern in which the first basic repeated pattern is symmetric with respect to the Y-axis in the middle portion of the first basic repeated pattern, in which the second basic repeated pattern is symmetric with respect to the origin in the middle portion of the second basic repeated pattern, and in which the same pattern is repeated within a half of the second basic repeated pattern A value having the same sign may be mapped to subcarriers with indexes, namely positive odd multiples of the number of repetitions T, and to subcarriers with indexes, namely negative odd multiples of the number of repetitions T. Here, the value may be obtained by multiplying the subcarrier phase value by the subcarrier sequence. Additionally, a value having different signs may be mapped to subcarriers with indexes, namely positive even multiples of the number of repetitions T, and to subcarriers with indexes, namely negative even multiples of the number of repetitions T.

$J_k$ may be always 1, $S_{Rp \cdot 2m} = -S_{-Rp \cdot 2m}$, and $S_{Rp \cdot (2m+1)} = S_{-Rp \cdot (2m+1)}$.

Alternatively, $S_{Rp \cdot 2m} = S_{-Rp \cdot 2m}$, and $S_{Rp \cdot (2m+1)} = S_{-Rp \cdot (2m+1)}$. When $k = -Rp \cdot 2m$, $J_k$ may be −1.

Alternatively, $S_{Rp \cdot 2m} = S_{-Rp \cdot 2m}$, and $S_{Rp \cdot (2m+1)} = S_{-Rp \cdot (2m+1)}$. When $k = Rp \cdot 2m$, $J_k$ may be −1.

Here, Rp denotes a number of repetitions, and m denotes a positive integer starting from 0.

(4) Pattern in which a characteristic of the real component is exchanged with a characteristic of the imaginary component in the above-described patterns (1), (2), and (3)

For the above pattern, may be multiplied by values used to realize the patterns (1), (2), and (3). In other words, $J_k$ may be j, or −j.

(5) Pattern in which the first basic repeated pattern is identical to the second basic repeated pattern The same subcarrier sequence may be mapped to two subcarriers corresponding to indexes with the same absolute value, and j may be multiplied by one subcarrier of the two subcarriers.

In other words, $S_{Rp \cdot 2m} = S_{-Rp \cdot 2m}$, and $S_{Rp \cdot (2m+1)} = S_{-Rp \cdot (2m+1)}$, j as $J_k$ may be mapped to a subcarrier corresponding to one k of $k = Rp \cdot m$ and $k = -Rp \cdot m$.

(6) Pattern in which a front part of the first basic repeated pattern based on the middle portion of the first basic repeated pattern has the same absolute value as a back part of the second basic repeated pattern based on the middle portion of the second basic repeated pattern, and in which a back part of the first basic repeated pattern based on the middle portion of the first basic repeated pattern has the same absolute value as a front part of the second basic repeated pattern based on the middle portion of the second basic repeated pattern In other words, $S_{Rp \cdot 2m} = -S_{-Rp \cdot 2m}$, and $S_{Rp \cdot (2m+1)} = S_{-Rp \cdot (2m+1)}$, j as $J_k$ may be mapped to a subcarrier corresponding to one k of $k = Rp \cdot m$ and $k = -Rp \cdot m$.

The pattern (6) will be further described with reference to FIG. 11.

Figure 11:
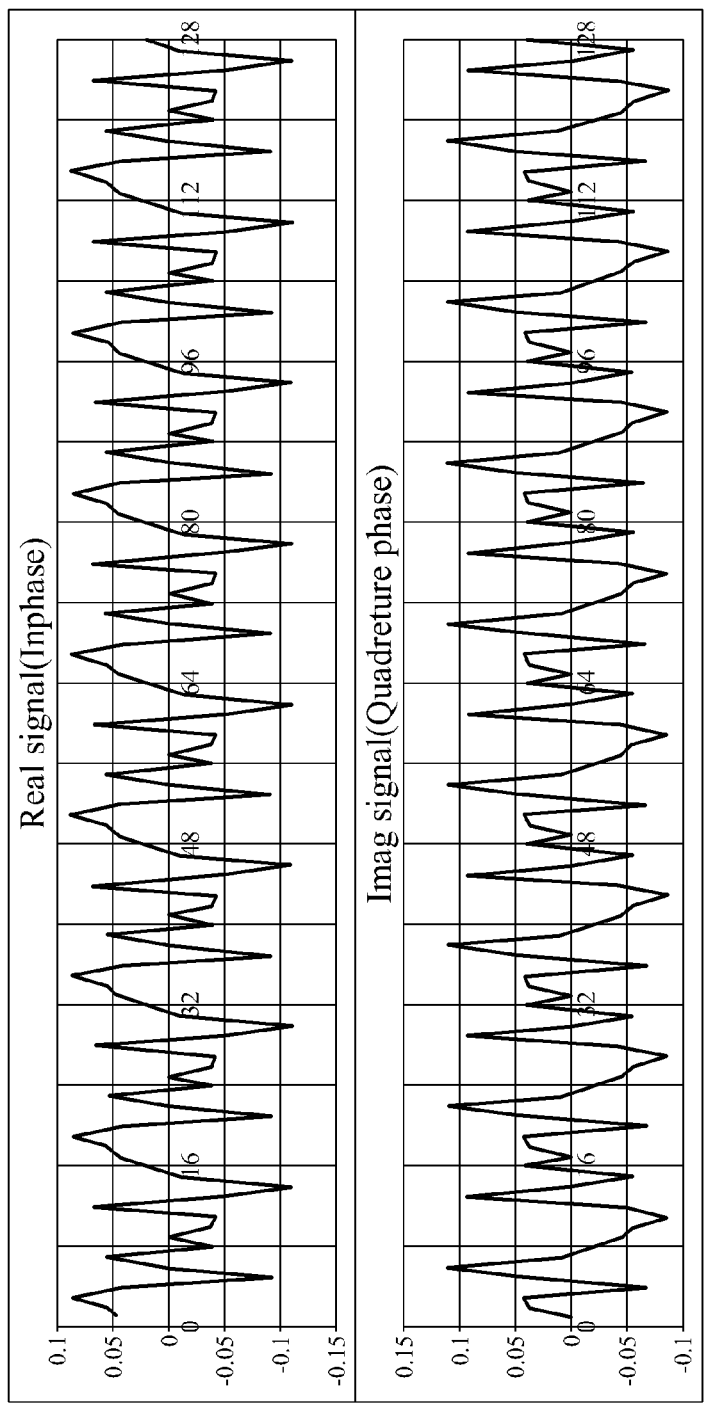
FIG. 11 illustrates values corresponding to subcarriers, and a real component and an imaginary component of a preamble in a time domain, in an example in which the front part of the first basic repeated pattern has the same absolute value as the back part of the second basic repeated pattern, and in which the hack part of the first basic repeated pattern has the same absolute value as the front part of the second basic repeated pattern.

FIG. 11 illustrates values corresponding to subcarriers, and a real component and an imaginary component, of a preamble in a time domain, in an example in which the front part of the first basic repeated pattern has the same absolute value as the back part of the second basic repeated pattern, and in which the back part of the first basic repeated pattern has the same absolute value as the front part of the second basic repeated pattern.

Referring to FIG. 11, it can be seen that the front part of the first basic repeated pattern has the same absolute value as the back part of the second basic repeated pattern, and that the back part of the first basic repeated pattern, has the same absolute value as the front part of the second basic repeated pattern. For the above pattern, as shown in a table of FIG. 11, $S_{Rp \cdot 2m} = -S_{-Rp \cdot 2m}$, and $S_{Rp \cdot (2m+1)} = S_{-Rp \cdot (2m+1)}$. Additionally, j as $J_k$ may be mapped to a subcarrier corresponding to one k of $k = Rp \cdot m$ and $k = -Rp \cdot m$.

(7) Pattern in which the front part of the first basic repeated pattern based on the middle portion of the first basic repeated pattern has the same value (naturally, the same absolute value) as the back part of the second basic repeated pattern based on the middle portion of the second basic repeated pattern, and in which the back part of the first basic repeated pattern based on the middle portion of the first basic repeated pattern has the same value as the front part of the second basic repeated pattern based an the middle portion of the second basic repeated pattern In other words, $S_{Rp\cdot 2m}=S_{-Rp\cdot 2m}$, and $S_{Rp\cdot(2m+1)}=-S_{-Rp\cdot(2m+1)}$. Additionally, j as $J_k$ may be mapped to a subcarrier corresponding to one k of k=Rp·m and k=−Rp·m. The pattern (7) will be further described with reference to FIG. 5.

Figure 4:
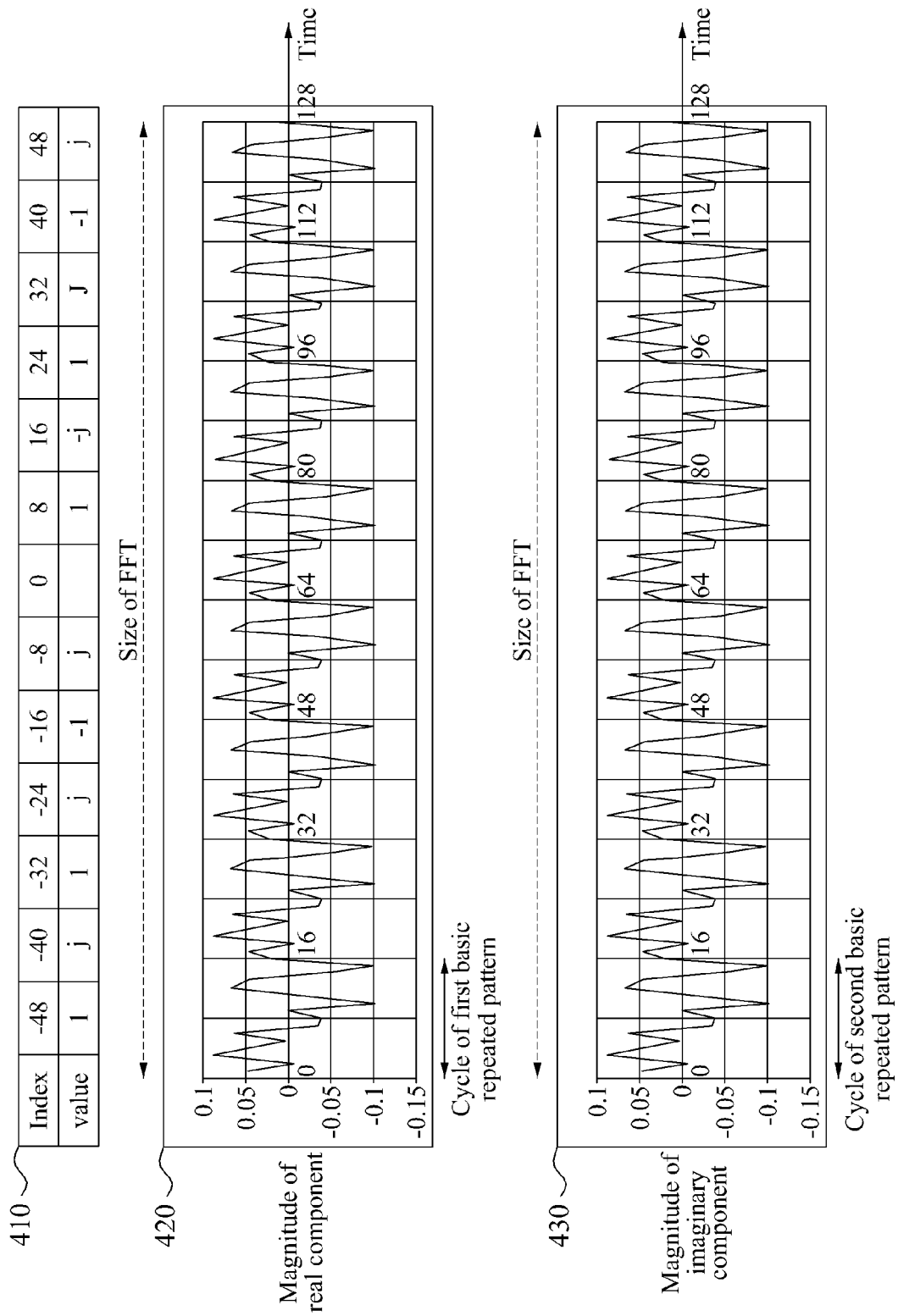
FIG. 4 illustrates values corresponding to subcarriers, and a real component and an imaginary component of a preamble in a time domain, in an example in which a first repeated pattern is identical to a second repeated pattern.

FIG. 4 illustrates values corresponding to subcarriers, and a real component and an imaginary component of a preamble in a time domain, in an example in which the first repeated pattern is identical to the second repeated pattern.

Referring to FIG. 4, a table 410 shows indexes of subcarriers, and values mapped to the subcarriers (that are obtained by multiplying a subcarrier sequence and a subcarrier phase value). As shown in the table 410, values having the same sign may be mapped to subcarriers corresponding to indexes with the same absolute value. However, j may be additionally multiplied by a sequence mapped to one subcarrier among the subcarriers corresponding to indexes with the same absolute value.

For example, a value of 1 may be mapped to a subcarrier with an index of −48, whereas a value of j may be mapped to a subcarrier with an index of 48. Additionally, a value of j may be mapped to a subcarrier with an index of −40, whereas a value of −1 may be mapped to a subcarrier with an index of 40.

The table 410 is associated with generating of a preamble with the pattern (5). Specifically, a plot 420 shows a real component of the preamble, and a plot 430 shows an imaginary component of the preamble. It can be seen that the first repeated pattern is identical to the second repeated pattern.

More specifically, for a period including 128 samples, the first repeated pattern and the second repeated pattern respectively include the first basic repeated pattern and the second basic repeated pattern. Each of the first basic repeated pattern and the second basic repeated pattern may be repeated 8 times. The first basic repeated pattern may also be identical to the second basic repeated pattern, in FIG. 4, N (namely, the size of FFT) may be 128, and R may be 16.

When an n-th complex, sample in a time domain is represented by x(n), a correlation value of x(n) may be represented, as follow:

$$\sum_{n=0}^{R-1} x(n) \cdot x^*(n+R).$$

For example, when the n-th complex sample is represented by (a+bj), an (n+R)-th sample may also be represented by (a+bj). The n-th complex sample and the (n+R)-th complex sample may be multiplied together using the following equation:

$$(a+bj)(a+bj)^* = a^2 + b^2$$

Additionally, the correlation value may also be obtained as follows:

$$\sum_{n=0}^{R-1} x(n) \cdot [j \cdot x(n+R)]$$

Additionally, when the n-th complex sample is represented by (a+aj), the (n+R)-th complex sample may also be represented by (a+aj). In particular, in each complex sample, a value of a real number 'Real' may be equal to a value of an imaginary number 'imag'. When n is 0, the two complex samples may be multiplied together using the following equation:

$$(a+aj)j(a+aj) = -2a^2$$

The receiver may apply various correlation algorithms. For example, assuming that a wireless channel and a frequency offset exist, a correlation value may be obtained regardless of an effect by the wireless channel and the frequency offset, through a correlation algorithm according to the following embodiment.

Transmission signals in an n-th complex sample, an (n+1)th complex sample, an (n+R)-th complex sample, and an (n+R+1)-th complex sample are respectively represented, as follows:

$$(a+aj),(b+bj),(c+cj),(d+dj)$$

Reception signals based on the wireless channel and frequency offset ϵ are represented, as follows:

$$h_n(a+aj)e^{j2\pi\varepsilon\frac{n}{N}}$$
$$h_{n+1}(b+bj)e^{j2\pi\varepsilon\frac{n+1}{N}}$$
$$h_{n+R}(c+cj)e^{j2\pi\varepsilon\frac{n+R}{N}}$$
$$h_{n+R+1}(d+dj)e^{j2\pi\varepsilon\frac{n+R+1}{N}}$$

When the n-th complex sample is represented by (a+aj), the (n+R)-th complex sample may also be represented by (a+aj) and accordingly, the reception signals may be represented, as follows:

$$h_n(a+aj)e^{j2\pi\varepsilon\frac{n}{N}}$$
$$h_{n+1}(b+bj)e^{j2\pi\varepsilon\frac{n+1}{N}}$$
$$h_{n+R}(a+aj)e^{j2\pi\varepsilon\frac{n+R}{N}}$$
$$h_{n+R+1}(b+bj)e^{j2\pi\varepsilon\frac{n+R+1}{N}}$$

When the n-th complex sample is represented by x(n), a correlation algorithm represented by the following expression may be used, $$\sum_{n=0}^{R-1} \{(x(n) \cdot [j \cdot x(n+R)])^* \cdot x(n+1) \cdot [j \cdot x(n+1+R)]\}$$

A result of calculation of a brace of the above expression is shown, as follows:

$$(x(n) \cdot [j \cdot x(n+R)])^* \cdot x(n+1) \cdot [j \cdot x(n+1+R)] =$$

$$\left(h_n(a+aj)e^{j2\pi\varepsilon\frac{n}{N}} \cdot j \cdot h_{n+R}(a+aj)e^{j2\pi\varepsilon\frac{n+R}{N}}\right)^* \cdot$$

$$\left(h_{n+1}(b+bj)e^{j2\pi\varepsilon\frac{n+1}{N}} \cdot j \cdot h_{n+R+1}(b+bj)e^{j2\pi\varepsilon\frac{n+R+1}{N}}\right) =$$

$$\left(h_n h_{n+R} e^{j2\pi\varepsilon\frac{n}{N}} e^{j2\pi\varepsilon\frac{n+R}{N}}(a+aj)(aj-a)\right)^* \cdot$$

$$\left(h_{n+1} h_{n+R+1} e^{j2\pi\varepsilon\frac{n+1}{N}} e^{j2\pi\varepsilon\frac{n+R+1}{N}}(b+bj)(bj-b)\right) =$$

$$h_n^* h_{n+R}^* e^{-j2\pi\varepsilon\frac{1}{N}(R+2n)}(-2a^2) \cdot h_{n+1} h_{n+R+1} e^{j2\pi\varepsilon\frac{1}{N}(R+2n+2)}(-2b^2)$$

Assuming that there is almost no change in a channel between two neighboring complex samples, $h_n \approx h_{n+1}$, and $h_{n+R} \approx h_{n+R+1}$. Here, the correlation algorithm may be represented as follows:

$$(x(n) \cdot [j \cdot x(n+R)])^* \cdot x(n+1) \cdot [j \cdot x(n+1+R)] = |h_n|^2 |h_{n+R}|^2 e^{j2\pi\frac{2\varepsilon}{N}}(4a^2 b^2).$$

In association with a value of $(4a^2b^2)$ in each complex sample, a value of the wireless channel may be a constant, and the frequency offset may be represented as a fixed phase rotation. Accordingly, a correlation value may be obtained for each complex sample.

Hereinafter, the pattern (7) based on the pattern (2) will be described. Specifically, a pattern in which j is additionally multiplied by one of two subcarriers having the same absolute value will be described in the pattern (2). In other words, $S_{Rp \cdot 2m} = S_{-Rp \cdot 2m}$, and $S_{Rp \cdot (2m+1)} = -S_{-Rp \cdot (2m+1)}$. Additionally, j as $J_k$ may be mapped to a subcarrier corresponding to one k of $k = Rp \cdot m$ and $k = -Rp \cdot m$.

Figure 5:
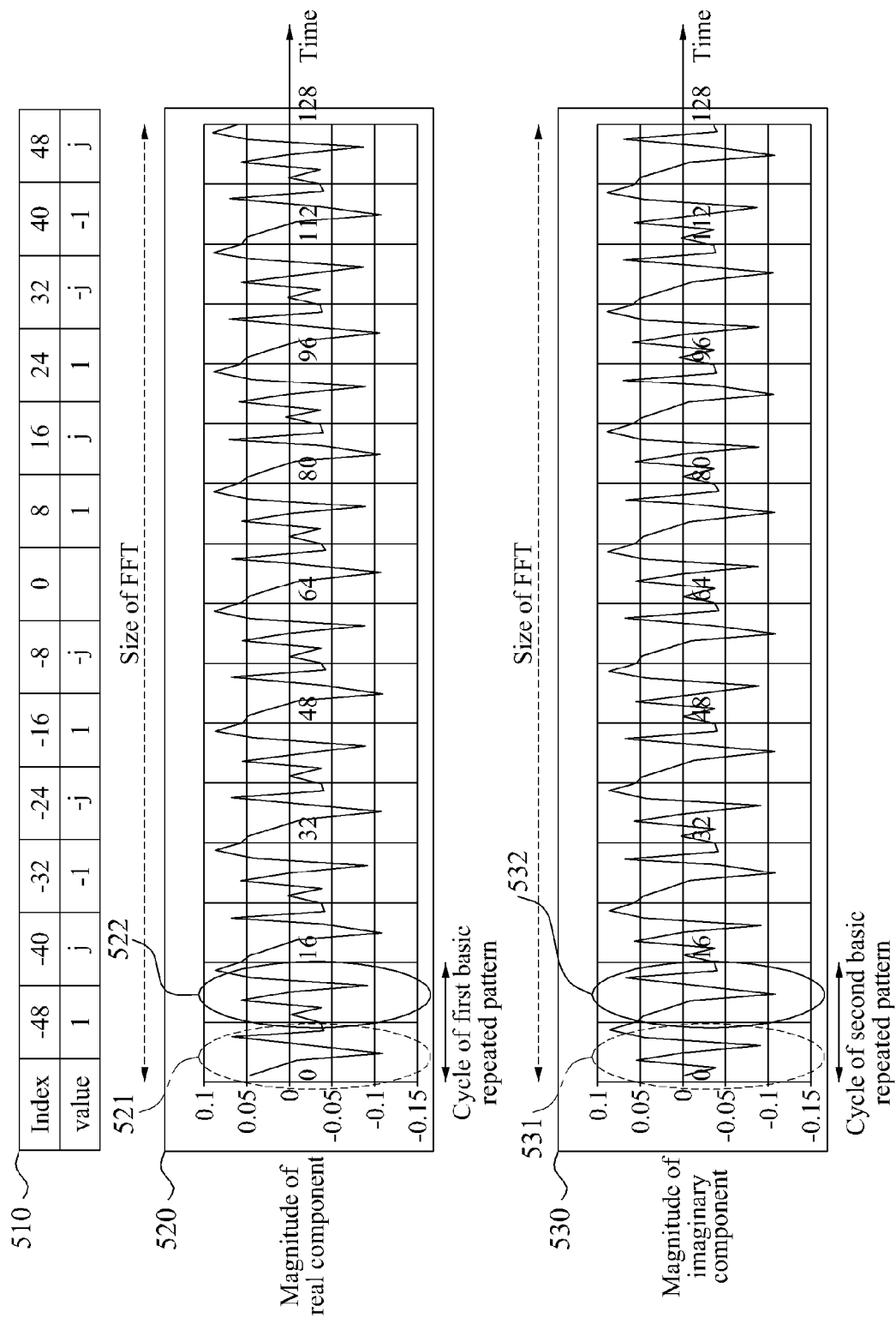
FIG. 5 illustrates values corresponding to subcarriers, and a real component and an imaginary component of a preamble in a time domain, in an example in which a front part of a first basic repeated pattern is identical to a back part of a second basic repeated pattern, and in which a back part of the first basic repeated pattern is identical to a front part of the second basic repeated pattern.

FIG. 5 illustrates values corresponding to subcarriers, and a real component and an imaginary component of a preamble in a time domain, in an example in which a front part of a first basic repeated pattern is identical to a back part of a second basic repeated pattern, and in which a back part of the first basic repeated pattern is identical to a front part of the second basic repeated pattern.

Referring to FIG. 5, a table 510 is associated with generating of a preamble with the pattern (7) based on the pattern (2). A plot 520 shows a real component of the preamble, and a plot 530 shows an imaginary component of the preamble. It can be seen that the first repeated pattern is identical to the second repeated pattern.

More specifically, for a period including 128 samples, the first repeated pattern and the second repeated pattern respectively include the first basic repeated pattern and the second basic repeated pattern. Each of the first basic repeated pattern and the second basic repeated pattern may be repeated 8 times. In FIG. 4, N (namely, the size of FFT) may be 128, and R may be 16.

Referring to the plot 520 and plot 530, a front part 521 of the first basic repeated pattern based on the middle portion of the first basic repeated pattern may have the same value as a back part 532 of the second basic repeated pattern based on the middle portion of the second basic repeated pattern. Additionally, a back part 522 of the first basic repeated pattern based on the middle portion of the first basic repeated pattern may have the same value as a front part 531 of the second basic repeated pattern based on the middle portion of the second basic repeated pattern.

The receiver may perform a synchronization algorithm, using an auto-correlation algorithm represented by the following expression. x(n) denotes an n-th complex sample in a received time domain. N denotes the size of FFT, and R denotes a number of samples included in a single basic repeated pattern. In the above drawing, N may be 128, and R may be 16.

$$\sum_{n=0}^{R-1} x(n) \cdot x^*(n+R)$$

For example, when the n-th complex sample is represented by (a+bj), the (n+R)-th sample may also be represented by (a+bj). When n is 0, the two complex samples may be multiplied together using the following equation:

$$(a+bj)(a+bj)^* = a^2 + b^2$$

Additionally, the correlation value may also be obtained as follows:

$$\sum_{n=0}^{R/2-1} x(n) \cdot [j \cdot x(n+R/2)]$$

For example, when the n-th complex sample is represented by (a+aj), an (n+R)-th sample may also be represented by (a+aj). In particular, in each complex sample, a value of 'Real' may be equal to a value of 'imag'. When n is 0, the two complex samples may be multiplied together using the following equation:

$$(a+aj)j(a+aj) = -2a^2$$

A correlation value may be obtained by the following correlation algorithm.

Transmission signals in an n-th complex sample, an (n+1)-th complex sample, an (n+R/2)-th complex sample, and an (n+R/2+1)-th complex sample are respectively assumed, as follows:

$$(a+bj), (c+dj), (e+fj), (g+hj)$$

Reception signals based on the wireless channel and frequency offset $\varepsilon$ are represented, as follows:

$$h_n(a+bj)e^{j2\pi\varepsilon\frac{n}{N}}$$

$$h_{n+1}(c+dj)e^{j2\pi\varepsilon\frac{n+1}{N}}$$

$$h_{n+R/2}(e+fj)e^{j2\pi\varepsilon\frac{n+R/2}{N}}$$

$$h_{n+R/2+1}(g+hj)e^{j2\pi\varepsilon\frac{n+R/2+1}{N}}$$

When the n-th complex sample is represented by (a+bj), the (n+R/2)-th complex sample may be represented by (b+aj) and accordingly, the reception signals may be represented, as follows:

$$h_n(a+bj)e^{j2\pi\varepsilon\frac{n}{N}}$$

$$h_{n+1}(c+dj)e^{j2\pi\varepsilon\frac{n+1}{N}}$$

$$h_{n+R/2+1}(b+aj)e^{j2\pi\varepsilon\frac{n+R/2+1}{N}}$$

$$h_{n+R/2+1}(d+cj)e^{j2\pi\varepsilon\frac{n+R/2+1}{N}}$$

When the n-th complex sample is represented by x(n), a correlation algorithm represented by the following expression may be used.

$$\sum_{n=0}^{R/2-1}\{(x(n)\cdot[j\cdot x(n+R/2)])^*\cdot x(n+1)\cdot[j\cdot x(n+1+R/2)]\}$$

Here, $$(x(n)\cdot[j\cdot x(n+R/2)])^*\cdot x(n+1)\cdot[j\cdot x(n+1+R/2)] =$$

$$\left(h_n(a+bj)e^{j2\pi\varepsilon\frac{n}{N}}\cdot j\cdot h_{n+R/2}(b+aj)e^{j2\pi\varepsilon\frac{n+R/2}{N}}\right)^*\cdot$$

$$\left(h_{n+1}(c+dj)e^{j2\pi\varepsilon\frac{n+1}{N}}\cdot j\cdot h_{n+R/2+1}(d+cj)e^{j2\pi\varepsilon\frac{n+R/2+1}{N}}\right) =$$

$$\left(h_n h_{n+R/2} e^{j2\pi\varepsilon\frac{n}{N}} e^{j2\pi\varepsilon\frac{n+R/2}{N}}(a+bj)(bj-a)\right)^*\cdot$$

$$\left(h_{n+1}h_{n+R/2+1}e^{j2\pi\varepsilon\frac{n+1}{N}}e^{j2\pi\varepsilon\frac{n+R/2+1}{N}}(c+dj)(dj-c)\right) = h_n^* h_{n+R/2}^*$$

$$e^{-j2\pi\varepsilon\frac{1}{N}(R/2+2n)}(-a^2-b^2)\cdot h_{n+1}h_{n+R/2+1}e^{j2\pi\varepsilon\frac{1}{N}(R/2+2n+2)}(-c^2-d^2).$$

Assuming that there is almost no change in a channel between two neighboring complex samples, $h_n \approx h_{n+1}$, and $h_{n+R/2} \approx h_{n+R/2+1}$.

Accordingly, the correlation algorithm may be represented as follows:

$$(x(n)\cdot[j\cdot x(n+R/2)])^*\cdot x(n+1)\cdot[j\cdot x(n+1+R/2)] =$$

$$|h_n|^2|h_{n+R/2}|^2 e^{j2\pi\frac{2\varepsilon}{N}}(-a^2-b^2)(-c^2-d^2)$$

A value of the wireless channel may be a constant, and the frequency offset may be represented as a fixe phase rotation. Accordingly, a correlation value may be obtained for each complex sample.

2. Method of Sharing Characteristic Information of Wireless Communication System As described above, the characteristic information of the wireless communication system may include information on a transmission mode, and information on a frequency band currently used in the wireless communication system. In particular, the information on the frequency band may include either channel difference information, or absolute value information of a channel. For example, when a plurality of frequency bands are simultaneously being used by the wireless communication system, a new communication apparatus accessing a wireless network may need to detect the currently used frequency bands.

A number of all available channels (frequency bands) may be represented by $N\_Avail\_Ch$, and a number of currently used channels may be represented by $N\_Oper\_Ch$. Information on a difference between each of the currently used channels and a next channel to be used may be called 'channel difference information.' The channel difference information $Ch_{Inform}$ may be transmitted from each of the currently used channels. The channel difference information $Ch_{Inform}$ may be represented as follows:

$$Ch_{Inform}=[Ch_{((n+1) mod N\_oper\_ch)}-Ch_n] \bmod N\_Avail\_$$
$$Ch, n: [0 \sim N\_Oper\_Ch-1]$$

Here, mod denotes a modular operation.

The computed channel difference information $Ch_{Inform}$ may be transmitted using the following methods:

A. Values mapped to a preamble (a subcarrier sequence and a subcarrier phase value) is determined using the channel difference information.

B. Locations of subcarriers corresponding to a value multiplied by j are determined using the channel difference information, in the above-described patterns (5) and (6).

C. Subcarriers used in generating of a preamble are selected, based on the channel difference information.

D. An initial value of a register for Cyclic Redundancy Check (CRC), and an initial value of a register for a scrambler are set based on the channel difference information.

Using method A, a single binary sequence (a sequence of the values mapped to the preamble) may be mapped to a single piece of channel difference information. A receiver may detect the binary sequence from a received signal, and may analyze the channel difference information based on the detected binary sequence.

In method B, the pattern (5) may be used. Method B will be further described with reference to FIG. 6.

FIG. 6 illustrates a table showing values corresponding to subcarriers according to an embodiment of the present invention. Referring to a table 610, j may be additionally multiplied by one of subcarriers corresponding to two indexes with the same absolute value. For example, a subcarrier corresponding to an index of −48 may be mapped to a value of 1, whereas a subcarrier corresponding to an index of 48 may be mapped to a value of j.

The channel difference information may be used to determine locations of subcarriers by which j is additionally multiplied. Referring to the table 610, it can be seen that j is additionally multiplied by subcarriers corresponding to indexes of 8, 16, 24, 32, 40, and 48. Since j may be additionally multiplied by 6 subcarriers maximum, channel difference information of 6 bits may be represented. For example, when j is not additionally multiplied by subcarriers with positive indexes, a channel difference of '1' may be represented. When j is additionally multiplied by only a subcarrier with an index of 8, a channel difference of '2' may be represented. When j is additionally multiplied by all subcarriers with positive indexes, a channel difference of '64' may be represented. By the above-described scheme, 64 types of channel difference information may be represented. Similarly to method A, the receiver may not perform correlation with respect to 64 sequences, and may analyze the channel difference information using a subcarrier phase value of a single sequence.

In method C, a part of 12 subcarriers may be selected based on a used frequency band. For example, when only two channels are used, subcarriers with indexes, namely odd multiples of 8, may be selected in a first channel, and subcarriers with indexes, namely even multiples of 8, may be selected in a second channel.

In method D, channel difference information may be represented using the initial value of the register for the scrambler or the initial value of the register for the CRC. Method D will be further described with reference to FIG. 7.

Figure 7:
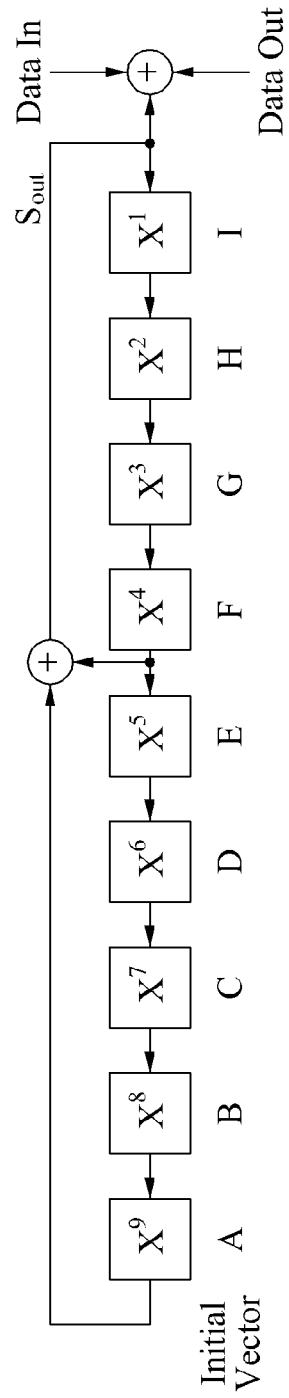
FIG. 7 illustrates a scrambler according to an embodiment of the present invention.

FIG. 7 illustrates a scrambler according to an embodiment of the present invention.

Registers $X^1, X^2, X^3, \ldots,$ and $X^9$ of FIG. 7 may form the scrambler. The scrambler may receive, as input, header information or packet data, and may scramble the input, initial values of 9 registers included in the scrambler may be determined to be A to I. In method C, channel difference information may be represented using the initial values. In other words, $2^9-1$ pieces of channel difference information may be represented, except that all of the initial values are 0.

The receiver may obtain pieces of reception data for each initial value, and may perform each CRC. Additionally, the receiver may acquire data demodulation information and channel difference information from an initial value without an error.

Alternatively, when a structure shown in FIG. 7 is used in CRC, values other than one of initial values A to I of the CRC may be set to channel difference information. The receiver may perform CRC with respect to a signal received for every channel difference information, and may acquire channel difference information from an initial value without an error.

The channel difference information may be transmitted using at least one of the above methods, or using at least two of the above methods. The above-described methods A through D may also be used to transmit the information on the transmission mode, or other information, in addition to the channel difference information.

Figure 8:
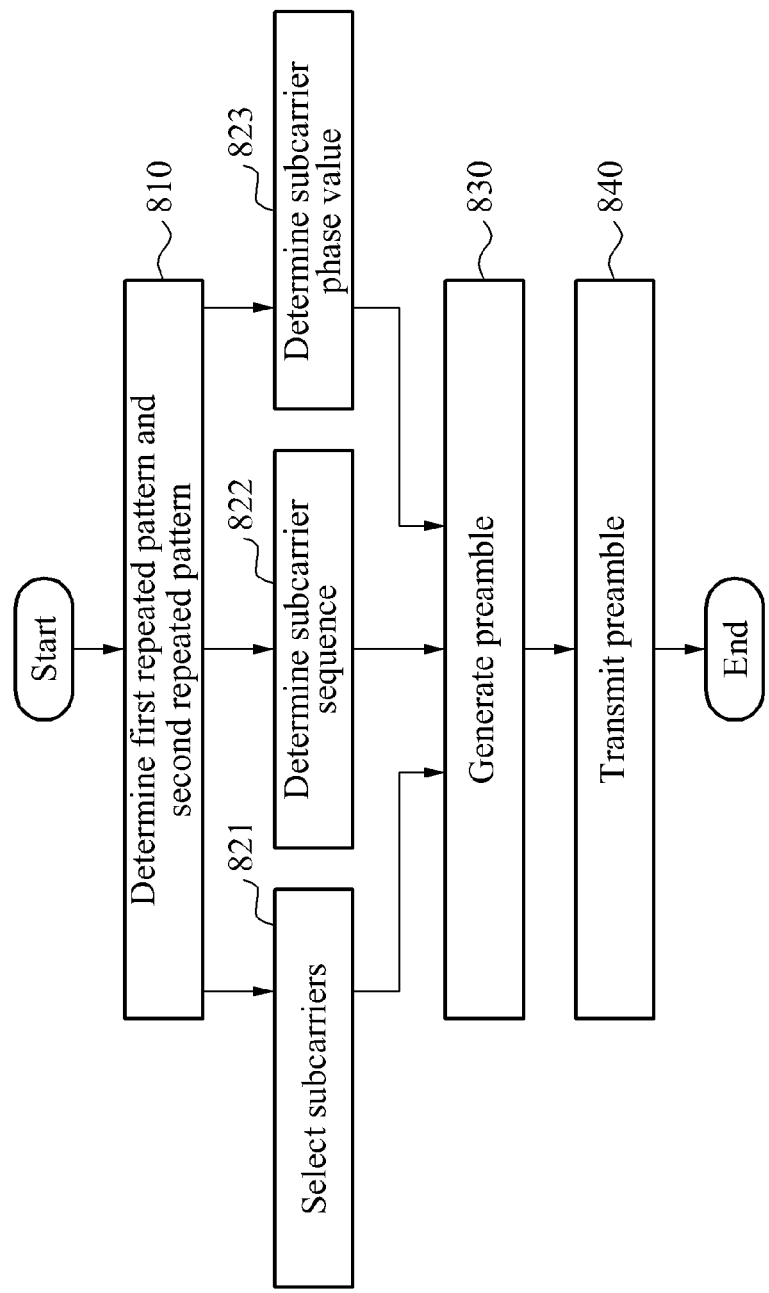
FIG. 8 is a flowchart illustrating a communication method of a transmitter according to an embodiment of the present invention.

FIG. 8 is a flowchart illustrating a communication method of a transmitter according to an embodiment of the present invention.

Referring to FIG. 8, in operation 810, a first repeated pattern of a real component of a preamble, and a second repeated pattern of an imaginary component of the preamble in a time domain may be determined.

The first repeated pattern and the second repeated pattern may be determined based on which subcarriers is selected from among all subcarriers, and which subcarrier sequence and which subcarrier phase value are assigned to the selected subcarriers.

Accordingly, in operation 821, at least two subcarriers may be determined from among a plurality of subcarriers. In operations 822 and 823, a subcarrier sequence and a subcarrier phase value of the preamble may be determined. The subcarrier sequence and the subcarrier phase value may be mapped to the at least two subcarriers.

The subcarrier sequence may be determined using a subcarrier sequence set including 1, and −1 and the subcarrier phase value may be determined using a subcarrier phase value set including 1, −1, j, and −j.

When each of the first repeated pattern and the second repeated pattern has R basic repeated patterns for the preset time period, the at least two subcarriers may be determined so that a gap between the at least two subcarriers may correspond to R. Here, R is a natural number.

The first basic repeated pattern may be symmetric with respect to the Y-axis in the middle portion of the first basic repeated pattern, the second basic repeated pattern may be symmetric with respect to the origin in the middle portion of the second basic repeated pattern, and the same pattern may be repeated within a half of the first basic repeated pattern.

Additionally, the first basic repeated pattern may be symmetric with respect to the Y-axis in the middle portion of the first basic repeated pattern, the second basic repeated pattern may be symmetric with respect to the origin in the middle portion of the second baste repeated pattern, and the same pattern may be repeated within a half of the second basic repeated pattern.

The first basic repeated pattern and the second basic repeated pattern may be identical to each other.

A front part of the first basic repeated pattern based on the middle portion of the first basic repeated pattern may be identical to a back part of the second basic repeated pattern based on the middle portion of the second basic repeated pattern, and a back part of the first basic repeated pattern based on the middle portion of the first basic repeated pattern may have the same absolute value as a front part of the second basic repeated pattern based on the middle portion of the second basic repeated pattern.

Characteristic information of the wireless communication system may include information on a frequency band currently used in the wireless communication system, or information on a transmission mode currently used in the wireless communication system.

The characteristic information of the wireless communication system may represent the information on the frequency band, using the subcarrier sequence and the subcarrier phase value that correspond to a relationship between the first repeated pattern and the second repeated pattern, or using selection of the at least two subcarriers.

The information on the frequency band may include channel difference information. The channel difference information may be associated with a difference between a first frequency band and a second frequency band when the first frequency band and the second frequency band are used.

The transmitter may generate a preamble by mapping the selected subcarriers to the subcarrier sequence and the subcarrier phase value in operation 830, and may transmit the preamble in operation 840.

Figure 9:
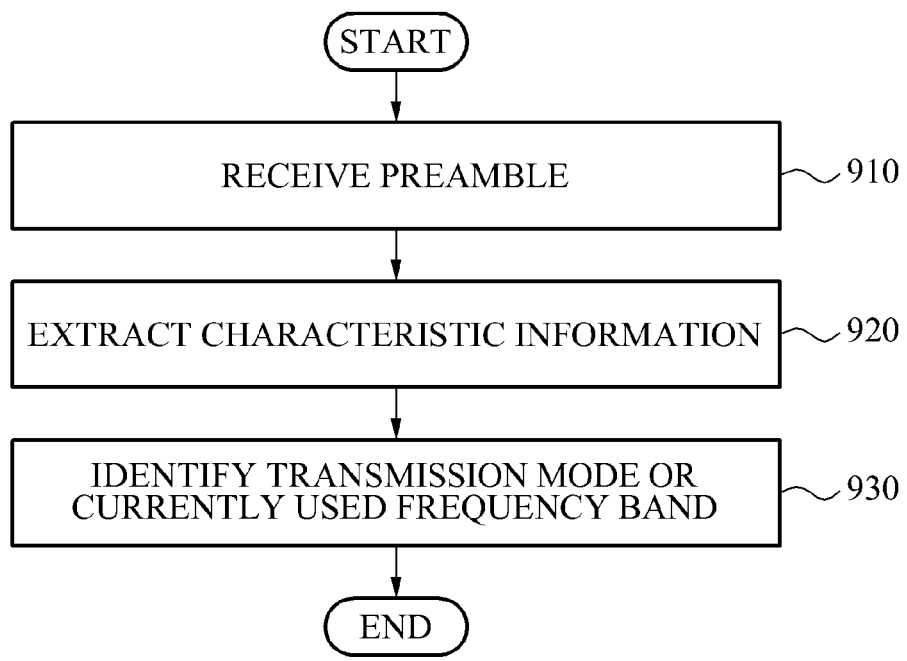
FIG. 9 is a flowchart illustrating a communication method of a receiver according to an embodiment of the present invention.

FIG. 9 is a flowchart illustrating a communication method of a receiver according to an embodiment of the present invention.

Referring to FIG. 9, in operation 910, the receiver may receive a preamble via at least two subcarriers among a plurality of subcarriers.

In operation 920, the receiver may extract characteristic information of the wireless communication system using the preamble. In operation 920, a correlation value of the preamble may be used to extract the characteristic information.

In operation 930, the receiver may identify a transmission mode, or a currently used frequency band, based on the extracted characteristic information.

Figure 10:
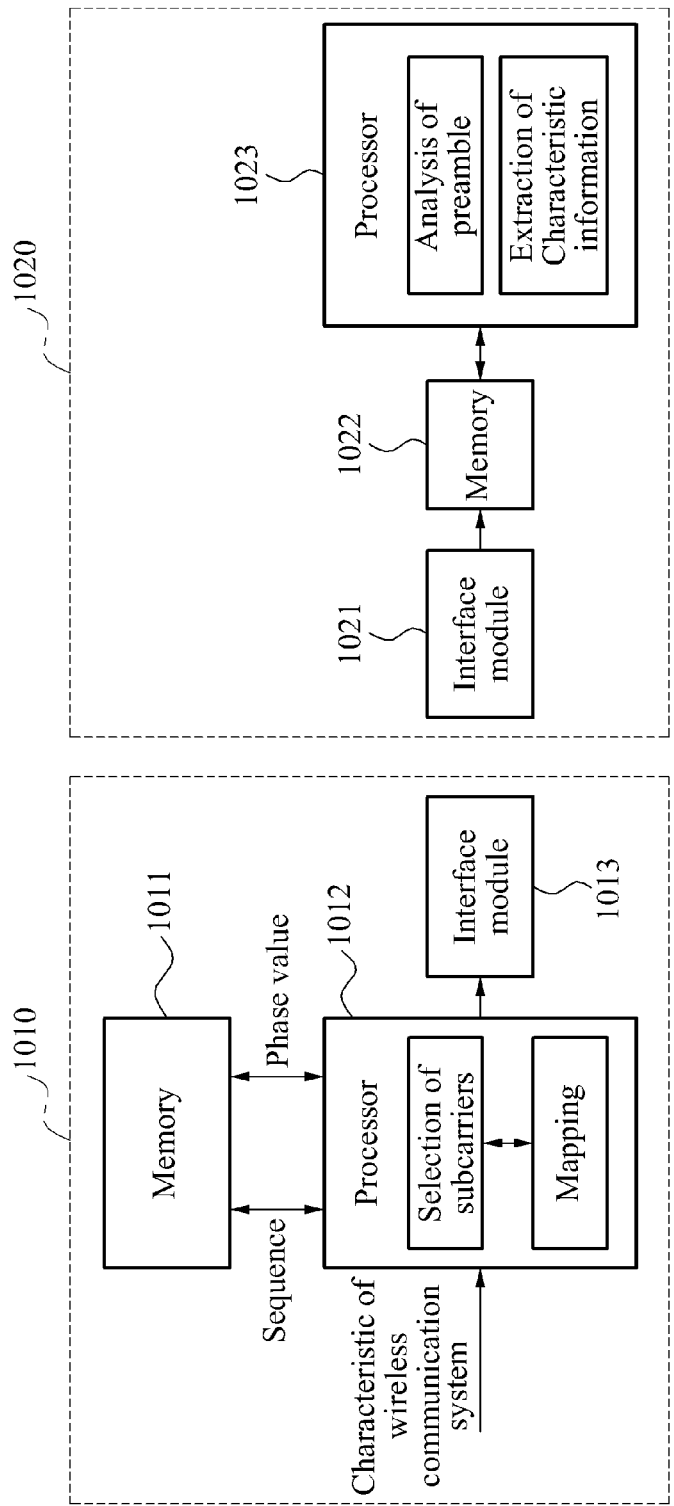
FIG. 10 is a block diagram illustrating communication apparatuses respectively corresponding to a transmitter and a receiver according to an embodiment of the present invention.

FIG. 10 is a block diagram illustrating communication apparatuses respectively corresponding to a transmitter and a receiver according to an embodiment of the present invention.

Referring to FIG. 10, a transmitter 1010 may include a memory 1011, a processor 1012, and an interface module 1013. Also, a receiver 1020 may include an interface module 1021, a memory 1022, and a processor 1023.

The memory 1011 of the transmitter 1010 may store candidates of a sequence, and candidates of a phase value that are required to generate a preamble. When a characteristic of the wireless communication system is determined, the processor 1012 may determine at least two subcarriers from among a plurality of subcarriers, may map a subcarrier sequence and a subcarrier phase value of the preamble to the at least two subcarriers, and may generate the preamble. The subcarrier sequence and the subcarrier phase value may be obtained from the memory 1011. The processor 1012 of the transmitter 1010 may transmit the preamble to the receiver 1020 via the interface module 1013.

In particular, when each of the first repeated pattern and the second repeated pattern includes R basic repeated patterns for the preset time period, the processor 1012 of the transmitter 1010 may determine the at least two subcarriers so that a gap between the at least two subcarriers may correspond to R. Here, R may be a natural number.

Here, the processor 1012 of the transmitter 1010 may map the subcarrier sequence and the subcarrier phase value to the at least two subcarriers, using a subcarrier sequence set including 1 and −1, and using a subcarrier phase value set including 1, −1, j, and j, based on a relationship between the first repeated pattern and the second repeated pattern.

The first repeated pattern may include a first basic repeated pattern repeated for the preset time period, and the second repeated pattern may include a second basic repeated pattern repeated for the preset time period. Here, the processor 1012 of the transmitter 1010 may determine the at least two subcarriers and map the subcarrier sequence and the subcarrier phase value to the at least two subcarriers, so that the first basic repeated pattern may be symmetric with respect to the Y-axis in the middle portion of the first basic repeated pattern, that the second basic repeated pattern may be symmetric with respect to the origin in the middle portion of the second basic repeated pattern, and that the same pattern may be repeated within a half of the first basic repeated pattern.

Additionally, the processor 1012 of the transmitter 1010 may determine the at least two subcarriers and map the subcarrier sequence and the subcarrier phase value to the at least two subcarriers, so that the first basic repeated pattern may be symmetric with respect to the Y-axis in the middle portion of the first basic repeated pattern, that the second basic repeated pattern may be symmetric with respect to the origin in the middle portion of the second basic repeated pattern, and that the same pattern may be repeated within a half of the second basic repeated pattern.

The processor 1012 of the transmitter 1010 may map the subcarrier sequence and the subcarrier phase value to the at least two subcarriers, using the subcarrier sequence set including 1 and −1, and using the subcarrier phase value set including 1, −1, j, and −j, based on a relationship between the first repeated pattern and the second repeated pattern. Here, the subcarrier phase value may be either j, or −j.

Additionally, the processor 1012 of the transmitter 1010 may determine the at least two subcarriers and map the subcarrier sequence and the subcarrier phase value to the at least two subcarriers, so that the first basic repeated pattern may be identical to the second basic repeated pattern.

Furthermore, the processor 1012 of the transmitter 1010 may determine the at least two subcarriers and map the subcarrier sequence and the subcarrier phase value to the at least two subcarriers, so that a front part of the first basic repeated pattern based on the middle portion of the first basic repeated pattern may be identical to, or may have the same absolute value as a back part of the second basic repeated pattern based on the middle portion of the second basic repeated pattern, and that a back part of the first basic repeated pattern based on the middle portion of the first basic repeated pattern may be identical to, or may have the same absolute value as a front part of the second basic repeated pattern based on the middle portion of the second basic repeated pattern.

The interface module 1021 of the receiver 1020 may receive the preamble from the transmitter 1010. The received preamble may be stored in the memory 1022. The processor 1023 may extract the characteristic information of the wireless communication system, using the preamble. In other words, the processor 1023 may identify which repeated pattern is included in the preamble, and may extract the characteristic information.

Here, the subcarrier sequence and the subcarrier phase value may be mapped to the at least two subcarriers, using the subcarrier sequence set including 1 and −1, and using the subcarrier phase value set including 1, −1, j, and −j, based on the relationship between the first repeated pattern and the second repeated pattern.

The above-described methods may be recorded in computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A communication method of a transmitter using a preamble in a wireless communication system, the communication method comprising:
    determining at least two subcarriers from among a plurality of subcarriers, for the preamble;
    mapping a subcarrier sequence and a subcarrier phase value of the preamble to the at least two subcarriers; and
    transmitting the preamble using the at least two subcarriers,
    wherein the preamble comprises a real component having a first repeated pattern in a preset time interval, and an imaginary component having a second repeated pattern in the preset time interval, and
    wherein a relationship between the first repeated pattern and the second repeated pattern indicates characteristic information of the wireless communication system,
    wherein the subcarrier sequence mapped to the at least two subcarriers is dependent on the first repeated pattern and the second repeated pattern.

2. The communication method of claim 1, wherein the mapping comprises mapping the subcarrier sequence and the subcarrier phase value to the at least two subcarriers, using a subcarrier sequence set comprising 1 and −1, and using a subcarrier phase value set comprising 1, −1, complex number j, and complex number −j, based on the relationship between the first repeated pattern and the second repeated pattern.

3. The communication method of claim 1, wherein the determining comprises determining the at least two subcarriers so that a gap between the at least two subcarriers corresponds to R, when each of the first repeated pattern and the second repeated pattern includes R basic repeated patterns for the preset time interval, wherein R is a natural number.

4. The communication method of claim 1, wherein the first repeated pattern comprises a first basic repeated pattern repeated for the preset time interval, and the second repeated pattern comprises a second basic repeated pattern repeated for the preset time interval, and
 wherein the determining and the mapping are performed, so that the first basic repealed pattern is symmetric with respect to a Y-axis in a middle portion of the first basic repeated pattern, that the second basic repeated pattern is symmetric with respect to an original point in a middle portion of the second basic repeated pattern, and that the same pattern is repeated within a half of the first basic repeated pattern.

5. The communication method of claim 1, wherein the first repeated pattern comprises a first basic repeated pattern repeated for the preset time interval, and the second repeated pattern comprises a second basic repeated pattern repeated for the preset time interval, and
 wherein the determining and the mapping are performed, so that the first basic repeated pattern is symmetric with respect to a Y-axis in a middle portion of the first basic repeated pattern, that the second basic repeated pattern is symmetric with respect to an original point in a middle portion of the second basic repeated pattern, and that the same pattern is repeated within a half of the second basic repeated pattern.

6. The communication method of claim 1, wherein the mapping comprises mapping the subcarrier sequence and the subcarrier phase value to the at least two subcarriers, using a subcarrier sequence set comprising 1 and −1, and using a subcarrier phase value set comprising 1, −1, complex number j, and complex number −j, based on the relationship between the first repeated pattern and the second repeated pattern, and
 wherein the subcarrier phase value is either the complex number j or the complex number −j.

7. The communication method of claim 1, wherein the first repeated pattern comprises a first basic repeated pattern repeated for the preset time interval, and the second repeated pattern comprises a second basic repeated pattern repeated for the preset time interval, and
 wherein the determining and the mapping are performed, so that the first basic repeated pattern and the second basic repeated pattern are identical to each other.

8. The communication method of claim 1, wherein the first repeated pattern comprises a first basic repeated pattern repeated for the preset time interval, and the second repeated pattern comprises a second basic repeated pattern repeated for the preset time interval, and
 wherein the determining and the mapping are performed, so that a front part of the first basic repeated pattern based on the middle portion of the first basic repeated pattern is identical to, or has the same absolute value as a back part of the second basic repeated pattern based on the middle portion of the second basic repeated pattern, and that a back part of the first basic repeated pattern based on the middle portion of the first basic repeated pattern is identical to, or has the same absolute value as a front part of the second basic repeated pattern based on the middle portion of the second basic repeated pattern.

9. The communication method of claim 1, wherein the characteristic information of the wireless communication system comprises information on a frequency band currently used in the wireless communication system, or information on a transmission mode currently used in the wireless communication system.

10. The communication method of claim 9, wherein the characteristic information of the wireless communication system represents the information on the frequency band, using the subcarrier sequence and the subcarrier phase value that correspond to the relationship between the first repeated pattern and the second repeated pattern, or using selection of the at least two subcarriers.

11. The communication method of claim 9, wherein the information on the frequency band comprises channel difference information, and
 wherein the channel difference information is associated with a difference between a first frequency band and a second frequency band when the first frequency band and the second frequency band are currently used.

12. A communication method of a receiver using a preamble in a wireless communication system, the communication method comprising:
 receiving a preamble via at least two subcarriers among a plurality of subcarriers; and
 extracting characteristic information of the wireless communication system using the preamble,
 wherein a subcarrier sequence and a subcarrier phase value of the preamble are mapped to the at least two subcarriers, and
 wherein the preamble comprises a real component having a first repeated pattern in a preset time interval, and an imaginary component having a second repeated pattern in the preset time interval, and a relationship between the first repeated pattern and the second repeated pattern indicates the characteristic information of the wireless communication system,
 wherein the characteristic information of the wireless communication system comprises information on a frequency band currently used in the wireless communication system, or information on a transmission mode currently used in the wireless communication system, and
 wherein the extracting comprises extracting the characteristic information of the wireless communication system using a correlation value of the preamble.

13. The communication method of claim 12, wherein the subcarrier sequence and the subcarrier phase value are mapped to the at least two subcarriers, using a subcarrier sequence set comprising 1 and −1, and using a subcarrier phase value set comprising 1, −1, complex number j, and complex number −j, based on the relationship between the first repeated pattern and the second repeated pattern.

14. The communication method of claim 12, wherein a gap between the at least two subcarriers corresponds to R, when each of the first repeated pattern and the second repeated pattern includes R basic repeated patterns for the preset time interval, wherein R is a natural number.

15. A method of generating a preamble in a wireless communication system, the method comprising:
 selecting at least two subcarriers from among a plurality of subcarriers, to generate a preamble comprising a real component having a first repeated pattern in a preset time interval, and an imaginary component having a second repeated pattern in the preset time interval;
 selecting a subcarrier sequence and a subcarrier phase value, using a subcarrier sequence set comprising 1 and −1, and using a subcarrier phase value set comprising 1, −1, complex number j, and complex number −j based on the relationship between the first repeated pattern and the second repeated pattern; and
 assigning the subcarrier sequence and the subcarrier phase value to the at least two subcarriers, and generating the preamble, wherein a relationship between the first repeated pattern and the second repeated pattern indicates characteristic information of the wireless communication system.

16. A communication apparatus to perform transmission or reception using a preamble in a wireless communication system, the communication apparatus comprising:
an interface to transmit or receive the preamble; and
a processor to generate the preamble to represent characteristic information of the wireless communication system, or to process the preamble to extract the characteristic information of the wireless communication system,
wherein the preamble comprises a real component having a first repeated pattern in a preset time interval, and an imaginary component having a second repeated pattern in the preset time interval, and
wherein a relationship between the first repeated pattern and the second repeated pattern indicates the characteristic information of the wireless communication system,
wherein a subcarrier sequence mapped to at least two subcarriers is dependent on the first repeated pattern and the second repeated pattern.

* * * * *